United States Patent
Nakai et al.

(10) Patent No.: US 8,257,638 B2
(45) Date of Patent: Sep. 4, 2012

(54) OPTICAL FILM CUTTING METHOD, AND APPARATUS USING THE SAME

(75) Inventors: Kouta Nakai, Ibaraki (JP); Junpei Kozasa, Ibaraki (JP); Masahiro Hosoi, Konosu (JP)

(73) Assignees: Nitto Denko Corporation, Osaka (JP); Akebono Machine Industries Co., Ltd., Saitama (JP)

( * ) Notice: Subject to any disclaimer, the term of this patent is extended or adjusted under 35 U.S.C. 154(b) by 408 days.

(21) Appl. No.: 12/670,976

(22) PCT Filed: Aug. 19, 2008

(86) PCT No.: PCT/JP2008/064745
§ 371 (c)(1),
(2), (4) Date: Jan. 27, 2010

(87) PCT Pub. No.: WO2010/021024
PCT Pub. Date: Feb. 25, 2010

(65) Prior Publication Data
US 2010/0206859 A1 Aug. 19, 2010

(51) Int. Cl.
*B29C 35/10* (2006.01)
*B23K 26/38* (2006.01)

(52) U.S. Cl. .............. 264/400; 219/121.67; 219/121.72; 425/403

(58) Field of Classification Search .................. 264/400, 264/500, 555; 83/451; 425/403, 472; 269/21; 219/121.67, 121.72
See application file for complete search history.

(56) References Cited

U.S. PATENT DOCUMENTS
| | | | | |
|---|---|---|---|---|
| 4,675,497 A * | 6/1987 | Pearl et al. | ............... | 219/121.67 |
| 2003/0034335 A1 | 2/2003 | Goto et al. | | |
| 2006/0107811 A1* | 5/2006 | Tanaka et al. | ................... | 83/175 |

FOREIGN PATENT DOCUMENTS
| | | |
|---|---|---|
| JP | 2000-15472 A | 1/2000 |
| JP | 2001-62584 A | 3/2001 |
| JP | 2001-287063 A | 10/2001 |
| JP | 2004-361741 A | 12/2004 |

OTHER PUBLICATIONS

International Search Report for Application No. PCT/JP2008/064745 mailed Nov. 18, 2008.

* cited by examiner

*Primary Examiner* — Samuel M Heinrich
(74) *Attorney, Agent, or Firm* — Cheng Law Group, PLLC

(57) ABSTRACT

A suction table 9 is disposed at a cutting action position for a polarizing film F, and holding blocks 9a and 9b, which are different in height from each other, are disposed in proximity to each other along a transport direction on a surface of the suction table 9 to form a suction groove 14. Nip rollers 11 and 12 are disposed on front and rear sides of the suction table 9 to nip opposed ends of the polarizing film F. Further, the suction table 9 suction-holds the polarizing film F in a state that the polarizing film F is inclined with the suction groove 14 located below a portion to be cut. In this state, a laser device 10 scans the polarizing film F along the suction groove 14 to cut the polarizing film F in a width direction.

5 Claims, 3 Drawing Sheets

OPTICAL FILM CUTTING METHOD, AND APPARATUS USING THE SAME

TECHNICAL FIELD

The present invention relates to an optical film cutting method capable of accurately cutting an optical film such as a polarizing film, a brightness enhancement film or a retardation film to be bonded to a substrate for use in a liquid crystal panel or the like and capable of improving efficiency of a cutting operation, and an apparatus using the same.

BACKGROUND ART

A conventional method for cutting an optical film to a predetermined length has been performed as follows. A strip-shaped optical film is fed from a master roll at a predetermined pitch, and is cut by a laser device in a width direction which is orthogonal to an optical film transport direction (refer to Patent Document 1).
Patent Document 1: JP 2004-361741 A

DISCLOSURE OF THE INVENTION

Problems to be Solved by the Invention

However, the conventional apparatus has the following problems. That is, a free front end of the cut optical film tends to curl downward because of a self weight. Accordingly, in a case where a front end of the strip-shaped optical film is cut at a cutting position and then a rear end of the strip-shaped optical film left on a downstream side is fed toward the cutting position, there arises a problem that the front end which curls downward falls into or becomes caught in a gap on a transport path.

This invention has been devised in view of the circumstances described above, and a principal object thereof is to provide an optical film cutting method capable of improving accuracy upon cutting of an optical film and efficiency of a cutting operation, and an apparatus using the same.

Solutions to the Problems

In order to diagnose and eliminate causes of problems which arise upon cutting of an optical film, the present inventors have eagerly conducted studies by repetitively performing experiments to cut an optical film. As a result, the present inventors could have attained the following novel findings.

That is, a front end of a strip-shaped optical film, which curls in a downward direction, i.e., a laser emitting direction, is prevented from falling into a suction groove formed between an upstream suction table and a downstream suction table in such a manner that the downstream suction table is set to become lower in surface height than the upstream suction table. In other words, a step is provided in a transport direction such that the optical film is placed in an inclined posture, and then the optical film is cut by use of a laser beam in this state. Thus, it has been possible to solve the problem that the front end of the optical film falls into the suction groove.

Further, it has been found by inspection of opposed cut end surfaces of the divided optical films that a contaminant adheres to only one of the end surfaces.

Specifically, when the optical film is cut by use of the laser beam, part thereof is melted and evaporated because of an influence of heat, so that smoke is produced. Herein, a component contained in the smoke adheres as a contaminant to the rear end of the sheet-like optical film which is cut to a predetermined length and is located on the side where the surface height is lower, i.e., the downstream side. However, such a contaminant hardly adheres to the front end of the strip-shaped optical film which is left on the side where the surface height is higher, i.e., the upstream side.

Conversely, it could have been confirmed that when the surface height of the upstream suction table is set to become lower than the surface height of the downstream suction table, the contaminant adheres to the front end of the strip-shaped optical film left on the upstream side, but is less prone to adhere to the rear end of the sheet-like optical film.

In order to accomplish the object described above, this invention employs the following configuration.

That is, this inventive method is an optical film cutting method for cutting a strip-shaped optical film to obtain a sheet-like optical film having a predetermined length, and this method includes suction-holding the strip-shaped optical film on a suction base having a suction groove formed along a width direction of a portion to be cut of the optical film, and cutting the optical film by use of a laser beam while sucking the optical film in a state that the optical film is inclined in a transport direction corresponding to a longitudinal direction with the suction groove located below the portion to be cut.

According to this method, the inclined optical film is cut along the suction groove formed in the width direction. As a result of comparison between a higher surface height of the optical film and a lower surface height of the optical film with respect to the portion to be cut, a contaminant contained in smoke produced upon cutting of the optical film does not adhere to a cut end surface of the optical film having the higher surface height. With regard to the optical film cut to the predetermined length, accordingly, the contaminant adhering to only one of the cut end surfaces is removed. In a conventional cutting method, opposed ends of a cut optical film must be subjected to a wiping process for removing a contaminant, respectively. On the other hand, the present invention requires only one contaminant removing process.

Herein, the optical film is inclined in such a manner that a step is provided between a surface height of the suction base on an upstream side and a surface height of the suction base on a downstream side in the optical film transport direction with respect to the suction groove. Therefore, it is possible to suitably implement the inventive method.

Preferably, the step is set such that the surface height of the suction base on the downstream side becomes lower than the surface height of the suction base on the upstream side. The cut optical film curls by a self weight toward the suction groove, i.e., in a laser beam emitting direction. Accordingly, when a portion serving as a rear end of the downstream optical film having the curling front end is fed toward a cutting action position, the front end falls into or becomes caught in the suction groove; however, the inventive method allows prevention of this disadvantage. Thus, it is possible to cut the optical film without generation of an unnecessary bending stress; therefore, it is possible to improve accuracy of keeping the cut optical film at a constant length.

In order to accomplish the object described above, this invention also employs the following configuration.

That is, an optical film cutting apparatus for cutting a strip-shaped optical film to obtain a sheet-like optical film having a predetermined length includes: a supply device that supplies the strip-shaped optical film; a suction base having a suction groove formed along a width direction of a portion to be cut of the optical film, and having a step in order to suction-hold the optical film in a state that the optical film is inclined in a transport direction corresponding to a longitudinal direction with the suction groove located below the portion to be cut; and a laser device that cuts the optical film suction-held on the suction base, along the suction groove.

According to this configuration, the inclined optical film can be cut with the suction groove located below the portion to be cut. Therefore, it is possible to suitably implement the inventive method described above.

Preferably, the step is set such that a surface height of the suction base on a downstream side becomes lower than a surface height of the suction base on an upstream side in the optical film transport direction with respect to the suction groove.

According to this configuration, in the optical film transport direction, the downstream surface height is set to become lower than the upstream surface height with respect to the suction groove. Therefore, the cut optical film curls by a self weight toward the suction groove, i.e., in a laser beam emitting direction. Accordingly, when a portion serving as a rear end of the downstream optical film having the curling front end is fed toward a cutting action position, the front end falls into or becomes caught in the suction groove; however, this configuration allows prevention of this disadvantage. Thus, it is possible to suitably implement the inventive method described above.

Effects of the Invention

In the optical film cutting method according to the present invention and the apparatus using the same, the inclined optical film is cut along the suction groove while being sucked from below, so that the contaminant adheres to only the cut end surface on the lower side. Accordingly, it is satisfactory that a process of removing a contaminant is performed on only one of the front end surface of the strip-shaped optical film and the rear end surface of the sheet-like optical film cut to the predetermined length in the transport direction. In other words, conventionally, such a process of removing a contaminant has been performed twice, that is, the process has been performed on opposed end surfaces. On the other hand, the present invention requires only one contaminant removing process.

DESCRIPTION OF REFERENCE SYMBOLS

Figure 1:
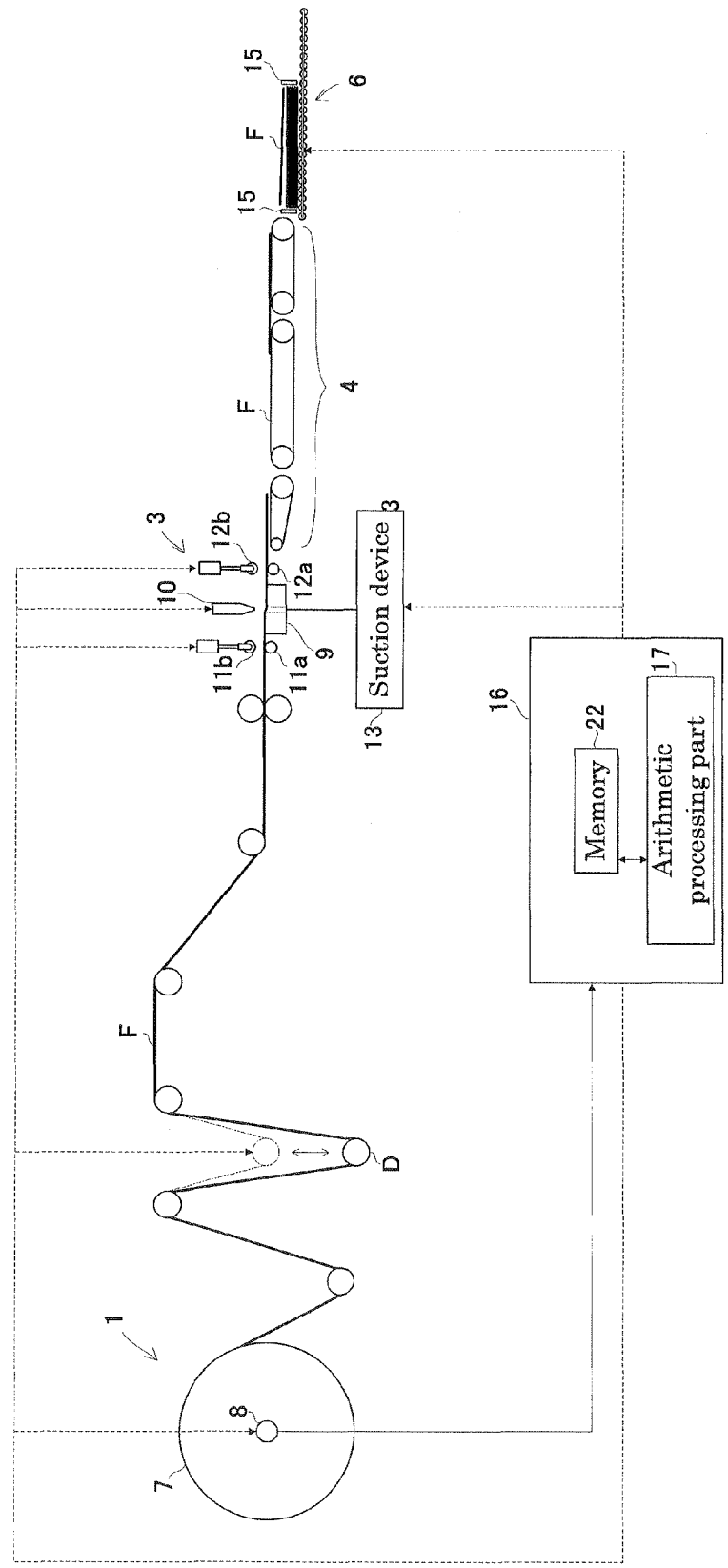
FIG. 1 shows a side view of a general configuration of an optical film cutting apparatus according to an embodiment of the present invention.

1 . . . Film supply unit
3 . . . Cutting mechanism
4 . . . Transport mechanism
6 . . . Carrying mechanism
9 . . . Suction table
9a . . . Holding block
9b . . . Holding block
11 . . . Nip roller
12 . . . Nip roller
16 . . . Control unit
F . . . Polarizing film

BEST MODE FOR CARRYING OUT THE INVENTION

With reference to the drawings, hereinafter, description will be given of embodiments of the present invention. In the present invention, an optical member is not particularly limited as long as it is a flexible, strip-shaped and functional film such as a polarizing film, a retardation film or a brightness enhancement film. In the embodiment of the present invention, description will be given of a case of employing a polarizing film by way of example.

FIG. 1 shows a schematic configuration of an optical film cutting apparatus that performs an optical film cutting method according to the present invention and involves steps in which cut optical films are housed in a stack manner and are made carriable.

As shown in FIG. 1, the apparatus according to this embodiment includes a film supply unit 1 that feeds and supplies a polarizing film F, a cutting mechanism 3 that cuts the polarizing film F to a predetermined length in a transport direction, a transport mechanism 4 that transports the cut polarizing film F, a carrying mechanism 6 that carries the polarizing film F, which is stacked at a terminal end of a transport path, to a subsequent step, and the like. It is to be noted that the film supply unit 1 corresponds to a supply device according to the present invention.

In the film supply unit 1, a bobbin 8 is loaded with a master roll 7 which is the polarizing film F in a roll state. Herein, the polarizing film F, which is wide in width, is slit to a predetermined dimension so as to have a strip shape. The bobbin 8 is coupled to a drive device such as a motor.

A dancer roller D is disposed between the film supply unit 1 and the cutting mechanism 3. The dancer roller D accumulates a feed amount of the polarizing film F supplied by the film supply unit 1, until the polarizing film F suction-held on a suction table 9 of the cutting mechanism 3 is cut by a laser device 10 and then the suction-holding is canceled.

The cutting mechanism 3 includes the suction table 9 that suction-holds a back side of the polarizing film F, the laser device 10, and a pair of nip rollers 11 and 12 that are disposed on upstream and downstream sides of the laser device 10, respectively, with the laser device 10 located therebetween to nip the polarizing film F.

Figure 2:
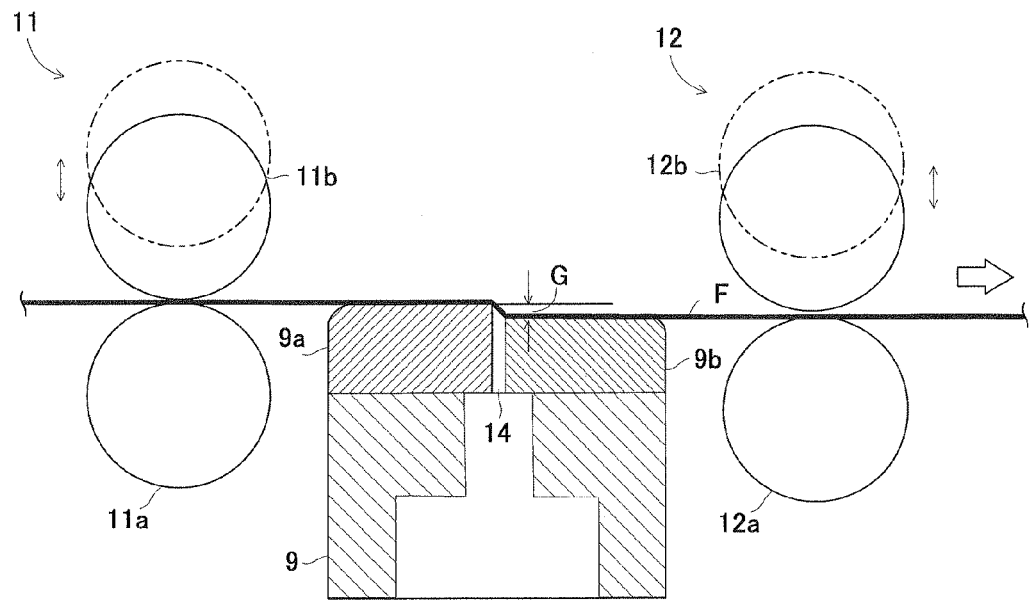
FIG. 2 shows an enlarged view of main components around a holding table.

As shown in FIG. 2, two holding blocks 9a and 9b, which are different in height from each other, are coupled to and fastened to a surface of the suction table 9 that communicates with and is connected to a suction device 13, with a bolt or the like in proximity to each other along the transport direction of the polarizing film F. That is, opposed inner sidewalls of the holding blocks 9a and 9b form a suction groove 14 which is orthogonal to the transport direction of the polarizing film F. In other words, the suction groove 14 serves as a scan path of a laser beam emitted from the laser device 10. It is to be noted that the suction table 9 as well as the holding blocks 9a and 9b correspond to a suction base according to the present invention.

In the transport direction of the polarizing film F, a rear end of the holding block 9a is chamfered whereas a front end of the holding block 9b is chamfered. Further, the downstream holding block 9b is set to become lower in surface height than the upstream holding block 9a. That is, the polarizing film F suction-held on the suction table 9 is inclined in the transport direction with the suction groove 14 located below the portion to be cut. Herein, a step height G formed by the surface heights of the holding blocks 9a and 9b is set to 0.3 to 0.7 mm in this embodiment, but is not limited to this numerical range. In other words, the step height G is appropriately set or changed in accordance with a type and a thickness of an optical film to be used herein.

The laser device 10 is movable horizontally so as to cut the polarizing film F along the suction groove 14, i.e., in a width direction.

The nip roller 11 (12) includes a lower drive roller 11a (12a) that is disposed in a fixed manner and can feed the polarizing film F, and a roller 11b (12b) that vertically moves between an upper standby position and an action position where the roller 11b (12b) nips the polarizing film F in cooperation with the drive roller. Herein, the drive roller 11a of the nip roller 11 disposed on the upstream side has a top which is set to become equal in level to the surface height of the holding block 9a. Moreover, the drive roller 12a of the nip roller 12 disposed on the downstream side has a top which is set to become equal in level to the surface height of the holding block 9b.

The transport mechanism 4 is contiguously disposed as a transport conveyor provided with a transport belt for transporting the polarizing film F which is fed by the nip roller 12 and is placed thereon.

The carrying mechanism 6 includes roller conveyors that are contiguously disposed at a position below a terminal end of the transport mechanism 4. Moreover, a tray 15 is provided at a starting end of the carrying mechanism 6, and receives the polarizing film F which falls from the transport mechanism 4.

A control unit 16 performs overall control of each mechanism. Description of the control unit 16 will be given later as description of operations of the apparatus described above.

The above description is about the configurations and functions of the main components of the optical film cutting apparatus according to the present invention. Next, description will be given of the operations of this apparatus, that is, the operations from the cutting of the strip-shaped polarizing film F to the carriage of the sheet-like polarizing film F.

First, the film supply unit 1 is loaded with a master roll 7 of a polarizing film F to be used herein. After completion of the loading, an operator conducts initial settings by use of an operation panel or the like. For example, the operator sets a length of the cut polarizing film F, a supply speed of the polarizing film F, output power of a laser beam, a focus of the laser beam, and the like.

After completion of the initial settings, the film supply unit 1 starts to supply the polarizing film F from the master roll 7. Further, a sensor such as a rotary encoder (not shown) detects a rotation speed of a drive shaft of the motor or the like of the film supply unit 1. Thus, the polarizing film F is supplied.

The polarizing film F is transported to the cutting mechanism 3. When a front end of the polarizing film F passes through the nip roller 12 and then reaches a predetermined position, the control unit 16 exerts control to activate the nip rollers 11 and 12, so that the nip rollers 11 and 12 nip the polarizing film F at opposed ends of the suction table. Moreover, the control unit 16 exerts control to activate the suction table 9 in this state, so that the suction table 9 starts to suction-hold the polarizing film F. In accordance with these operations, the control unit 16 exerts control to activate the dancer roller D such that the polarizing film F which is continuously supplied by the film supply unit 1 does not pass the dancer roller D.

The suction-held polarizing film F is held while being inclined in the transport direction with the suction groove 14 located below the portion to be cut. In this state, the laser device 10 scans from one side edge to the other side edge of the polarizing film F along the suction groove 14. The polarizing film F is cut in accordance with this operation.

Figure 3:
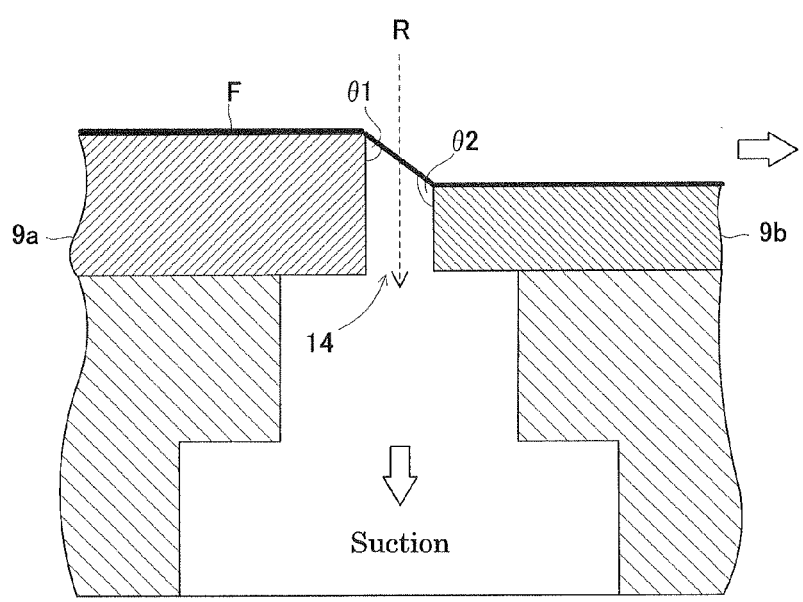
FIG. 3 shows a state of a suction groove upon cutting of a polarizing film.

As shown in FIG. 3, herein, an angle θ1 formed by the inner wall of the holding block 9a and the polarizing film F in the suction groove is acuter than an angle θ2 formed by the inner wall of the holding block 9b and the polarizing film F in the suction groove. With respect to an optical axis R of the laser beam, an upstream space is narrower than a downstream space. Therefore, when the suction table 9 performs the sucking operation, a suction force to be acted on the upstream space becomes higher than a suction force to be acted on the downstream space. Thus, on the upstream side with respect to the optical axis R of the laser beam, smoke produced upon cutting of the polarizing film F is rapidly sucked and removed. On the other hand, on the downstream side, the suction force to be acted is weaker than the suction force to be acted on the upstream side; therefore, a rate of sucking the smoke produced upon cutting of the polarizing film F is slow. Consequently, the smoke remains in the downstream space during a short period of time. Accordingly, when the opposed end surfaces of the divided polarizing films F are compared with each other, the upstream cut end surface has no contact with the smoke; therefore, the contaminant due to the influence of the smoke hardly adheres to the upstream cut end surface.

When the polarizing film F is cut, the suction by the suction table 9 and the nip by the nip rollers 11 and 12 are canceled. In accordance with this cancelation, the transport mechanism 4 transports the cut polarizing film F toward the carrying mechanism 6. Simultaneously, the control unit 16 exerts control to activate the dancer roller D such that the polarizing film F is fed toward the cutting mechanism 3.

The tray 15 is provided at the starting end of the carrying mechanism 6, and the polarizing film F is stacked on the tray 15.

When the polarizing films F are stacked in predetermined number on the tray 15 by repetition of the series of operations described above, the control unit 16 activates the carrying mechanism 6 to carry the stacked polarizing films F to a subsequent step.

In the apparatus according to this embodiment, the height of the downstream holding block 9b is set to become lower than the height of the upstream holding block 9a on the holding table 9, so that the step is provided in the transport direction, i.e., in the longitudinal direction of the polarizing film F with respect to the suction groove 14. Thus, the polarizing film F can be suction-held at the portion of the inclined suction groove 14 in the transport direction. As a result, even when the polarizing film F curls downward, i.e., in a laser emitting direction because of an influence of heat generated in a cutting operation using a laser beam, a front end of the polarizing film F being fed from the upstream side neither falls into nor becomes caught in the suction groove 14. Accordingly, the rear end of the upstream polarizing film F can be cut without receiving an unnecessary bending stress. Thus, it is possible to improve accuracy of keeping the cut polarizing film at a constant length.

In the inside space of the suction groove 14 which is divided with respect to the optical axis R of the laser beam, in particular, the upstream space is formed to be narrow and therefore is enhanced in suction force as compared with the downstream space. In the upstream space, smoke produced upon cutting of the polarizing film F can be rapidly sucked and removed; therefore, a contaminant due to an influence of the smoke does not adhere to the front end of the polarizing film F in the transport direction. With regard to the cut polarizing film F, accordingly, only the contaminant adhering to the rear end is removed. According to a conventional technique, opposed end surfaces of a cut optical film must be subjected to a process of removing a contaminant, respectively. On the other hand, the apparatus according to this embodiment requires only one contaminant removing process, leading to improvement in working efficiency.

Specific Examples

In the apparatus according to this embodiment, the polarizing film F was cut by experiment while the step height was set to 0.3, 0.5, 0.7 and 1.0 mm. Herein, the thickness of the polarizing film is 310 μm and the width of the suction groove is 2 mm. Table 1 shows results of the experiment.

TABLE 1

| Step (mm) | Whether to become caught in suction groove | Adhesion of foreign matters | Cutting failure |
|---|---|---|---|
| 0.0 | X | X | ◯ |
| 0.3 | ◯ | Δ | ◯ |
| 0.5 | ◯ | ◯ | ◯ |
| 0.7 | ◯ | Δ | Δ |
| 1.0 | ◯ | X | X |

As shown in Table 1, evaluations of respective items are defined as follows. With regard to the item "Whether to become caught in suction groove", a symbol "◯" denotes that the front end of the polarizing film F did not become caught in the suction groove 14, and a symbol "X" denotes that the front end of the polarizing film F became caught in the suction groove 14. With regard to the item "Adhesion of foreign matters", a symbol "◯" denotes that the adhesion of foreign matters could be visually recognized only at the rear end of the polarizing film on the downstream side, a symbol "Δ" denotes that the adhesion of foreign matters was recognized at each of the rear end of the polarizing film on the downstream side and the front end of the polarizing film on the upstream side to such an extent that the foreign matters can be visually recognized, and a symbol "X" denotes that the adhesion of foreign matters (in high concentrations) was clearly recognized at each of the rear end of the polarizing film on the downstream side and the front end of the polarizing film on the upstream side. With regard to the item "Cutting failure", a symbol "◯" denotes that the cut section was flat and the cutting state was excellent, a symbol "Δ" denotes that the cut ssection was coarse, and a symbol "X" denotes that there was an uncut portion.

Accordingly, it is apparent from the results of cutting that the step height preferably falls within a range of 0.3 to 0.7 mm. If the step height is smaller than 0.3 mm, foreign matters adhere to each of the opposed cut end surfaces of the divided polarizing films F. If the step height is larger than 0.7 mm, the cutting failure occurs because of deviation of the focus of the laser beam. Further, since smoke is produced in large amount, a contaminated area at the cut end surface of the polarizing film F is extended.

The present invention may be embodied in forms modified as described below.

(1) In the apparatus according to the foregoing embodiment, the surface height of the downstream holding block 9a is set to become lower than the surface height of the upstream holding block 9b; however, this combination is appropriately changed in accordance with the curling state of the polarizing film F when being cut. That is, in a case where the cut polarizing film F curls upward, the surface height of downstream holding block 9b may be set to become higher than the surface height of the upstream holding block 9a.

Figure 4:
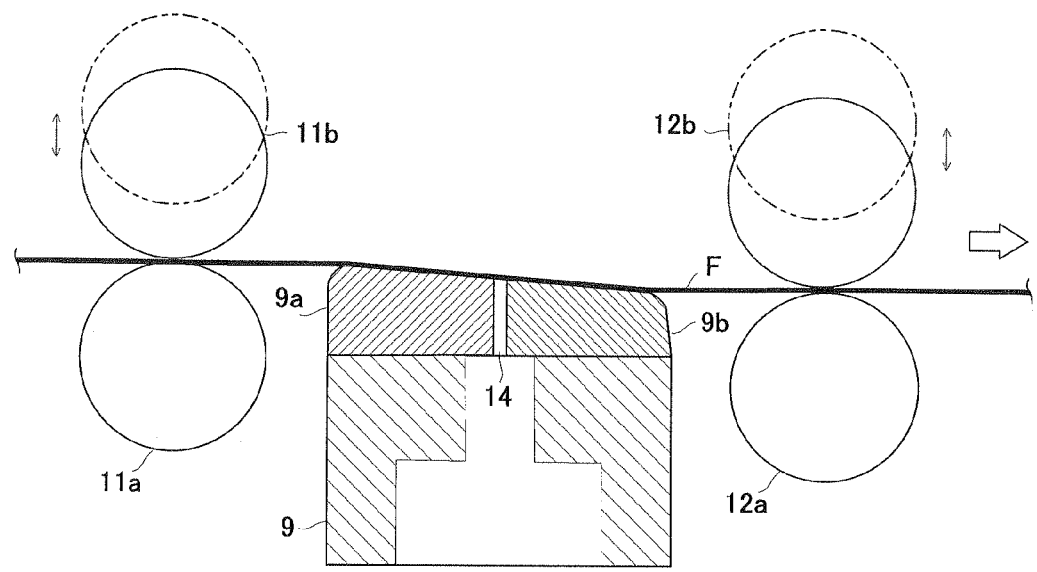
FIG. 4 shows an enlarged view of main components around a holding table in an apparatus according to a modification of the present invention.

(2) In the apparatus according to the foregoing embodiment, the holding blocks 9a and 9b may be configured such that the surfaces thereof are inclined from the upstream side toward the downstream side as shown in FIG. 4.

(3) The apparatus according to the foregoing embodiment is also applicable to a polarizing film with a separator.

(4) In the apparatus according to the foregoing embodiment, the holding table 9 as well as the holding blocks 9a and 9b may be integrated into one.

INDUSTRIAL APPLICABILITY

As described above, the present invention is suitable for accurately cutting an optical film.

The invention claimed is:

1. An optical film cutting method for cutting a strip-shaped optical film to obtain a sheet-like optical film having a predetermined length, comprising
    suction-holding the strip-shaped optical film on a suction base having a suction groove formed along a width direction of a portion to be cut of the optical film, and cutting the optical film by use of a laser beam while sucking the optical film in a state that the optical film is inclined in a transport direction corresponding to a longitudinal direction with the suction groove located below the portion to be cut.

2. The optical film cutting method according to claim 1, wherein
    a step is provided between a surface height of the suction base on an upstream side and a surface height of the suction base on a downstream side in the optical film transport direction with respect to the suction groove.

3. The optical film cutting method according to claim 2, wherein
    the step is set such that the surface height of the suction base on the downstream side becomes lower than the surface height of the suction base on the upstream side.

4. An optical film cutting apparatus for cutting a strip-shaped optical film to obtain a sheet-like optical film having a predetermined length, comprising;
    a supply device that supplies the strip-shaped optical film;
    a suction base having a suction groove formed along a width direction of a portion to be cut of the optical film, and having a step in order to suction-hold the optical film in a state that the optical film is inclined in a transport direction corresponding to a longitudinal direction with the suction groove located below the portion to be cut; and
    a laser device that cuts the optical film suction-held on the suction base, along the suction groove.

5. The optical film cutting apparatus according to claim 4, wherein
    the step is set such that a surface height of the suction base on a downstream side becomes lower than a surface height of the suction base on an upstream side in the optical film transport direction with respect to the suction groove.

* * * * *